United States Patent [19]
Yam

[11] Patent Number: 5,938,335
[45] Date of Patent: Aug. 17, 1999

[54] SELF-CALIBRATING TEMPERATURE PROBE

[75] Inventor: Mark Yam, San Jose, Calif.

[73] Assignee: Applied Materials, Inc., Santa Clara, Calif.

[21] Appl. No.: 08/629,422

[22] Filed: Apr. 8, 1996

[51] Int. Cl.[6] ............................................. G01J 5/00
[52] U.S. Cl. ......................................................... 374/124
[58] Field of Search .................................... 374/121, 124, 374/9, 1, 130, 131; 219/61.6, 76.11

[56] References Cited

U.S. PATENT DOCUMENTS

| | | | |
|---|---|---|---|
| Re. 31,832 | 2/1985 | Samulski ................................... | 374/131 |
| 4,278,349 | 7/1981 | Sander ........................................ | 356/44 |
| 4,307,607 | 12/1981 | Saaski et al. ............................... | 73/356 |
| 4,544,418 | 10/1985 | Gibbons ..................................... | 148/1.5 |
| 4,854,727 | 8/1989 | Pecot et al. ............................... | 374/121 |
| 4,891,499 | 1/1990 | Moslehi ..................................... | 219/502 |
| 4,919,542 | 4/1990 | Nulman et al. ............................. | 374/9 |
| 4,956,538 | 9/1990 | Moslehi ..................................... | 219/121 |
| 4,969,748 | 11/1990 | Crowley et al. ............................ | 374/1 |
| 4,979,134 | 12/1990 | Arima et al. . | |
| 4,984,902 | 1/1991 | Crowley et al. ............................ | 374/1 |
| 5,154,512 | 10/1992 | Schietinger et al. ....................... | 374/9 |
| 5,155,336 | 10/1992 | Gronet et al. ............................. | 219/411 |
| 5,156,461 | 10/1992 | Moslehi et al. ............................ | 374/121 |
| 5,180,226 | 1/1993 | Moslehi ..................................... | 374/127 |
| 5,255,286 | 10/1993 | Moslehi et al. ............................ | 374/121 |
| 5,265,957 | 11/1993 | Moslehi et al. ............................ | 374/1 |
| 5,268,989 | 12/1993 | Moslehi et al. ............................ | 392/418 |
| 5,293,216 | 3/1994 | Moslehi ..................................... | 356/371 |
| 5,305,417 | 4/1994 | Nijm et al. ................................. | 392/418 |
| 5,317,492 | 5/1994 | Gronet et al. ............................. | 362/294 |
| 5,317,656 | 5/1994 | Moslehi et al. ............................ | 385/12 |
| 5,324,937 | 6/1994 | Chen et al. ................................ | 250/252 |
| 5,326,170 | 6/1994 | Moslehi et al. ............................ | 374/2 |
| 5,367,606 | 11/1994 | Moslehi et al. ............................ | 392/418 |
| 5,377,126 | 12/1994 | Flik et al. .................................. | 364/557 |
| 5,436,172 | 7/1995 | Moslehi ..................................... | 437/8 |
| 5,436,494 | 7/1995 | Moslehi ..................................... | 257/467 |
| 5,443,315 | 8/1995 | Lee et al. ................................... | 374/126 |
| 5,444,815 | 8/1995 | Lee et al. ................................... | 392/416 |
| 5,446,824 | 8/1995 | Moslehi ..................................... | 392/416 |
| 5,474,381 | 12/1995 | Moslehi ..................................... | 374/161 |
| 5,508,934 | 4/1996 | Moslehi et al. ............................ | 364/468 |
| 5,549,756 | 8/1996 | Sorenson et al. ......................... | 374/121 |
| 5,553,939 | 9/1996 | Dilhac et al. .............................. | 374/1 |
| 5,618,461 | 4/1997 | Burke et al. ............................... | 219/502 |
| 5,635,409 | 6/1997 | Moslehi ..................................... | 438/7 |
| 5,715,361 | 2/1998 | Moslehi ..................................... | 392/416 |
| 5,741,070 | 4/1998 | Moslehi ..................................... | 374/161 |

FOREIGN PATENT DOCUMENTS

| | | |
|---|---|---|
| 0 612 862 A1 | 8/1994 | European Pat. Off. . |
| 3221382 A1 | 12/1982 | Germany . |
| 54-34285 | 3/1979 | Japan . |
| 55-99035 | 7/1980 | Japan . |
| 56-49929 | 5/1981 | Japan . |
| 57-131027 | 8/1982 | Japan . |
| 62-022036 | 1/1987 | Japan . |
| 2 056 669 | 3/1981 | United Kingdom . |

OTHER PUBLICATIONS

A. I. Pyzhkov, "Measurement Techniques—Stable source of infrared radiation for photometer calibration", *Izmeritelnaya Tekhnika*, vol. 29, No. 4, pp. 14–15, Apr., 1986.

F. J. Bryant et al., "Infrared absorption measurements in the field using LED sources", *Power Engineering Journal*, Mar. 1992.

*Primary Examiner*—George Dombroske
*Assistant Examiner*—Jewel V. Thompson
*Attorney, Agent, or Firm*—Fish & Richardson

[57] ABSTRACT

A probe for measuring the temperature of a substrate in a substrate processing chamber. The probe includes a light pipe, one end of which is inserted into the processing chamber. The other end of the light pipe is connected to a bifurcated optical fiber. A light source is optically coupled to one branch of the optical fiber, and a pyrometer is optically coupled to another branch. To self-calibrate the probe, an object of stable reflectivity, e.g., a gold-plated wafer, is inserted into the chamber, the light source is activated, and the intensity of light reflected from the object is measured by the pyrometer.

38 Claims, 6 Drawing Sheets

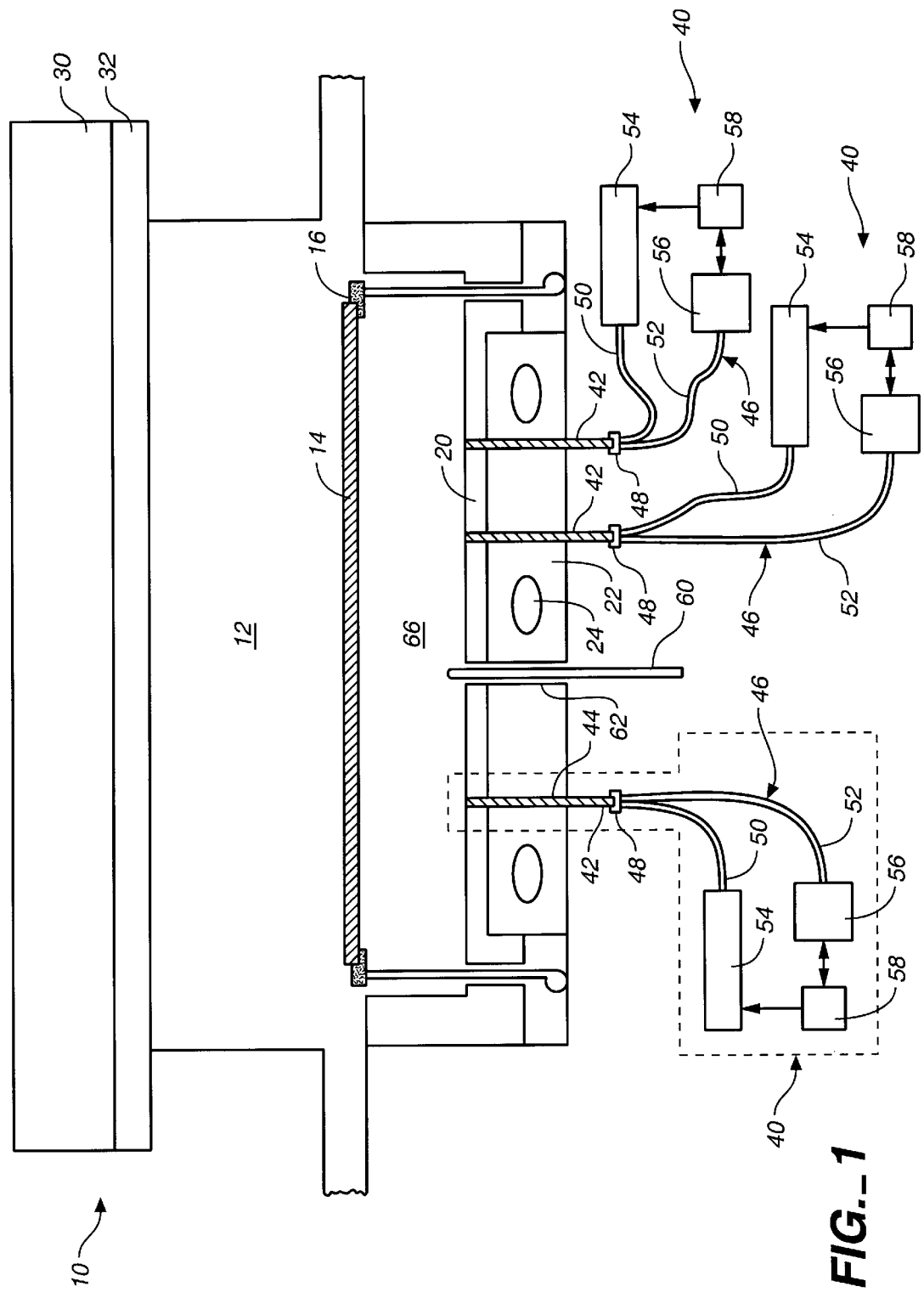
FIG._1

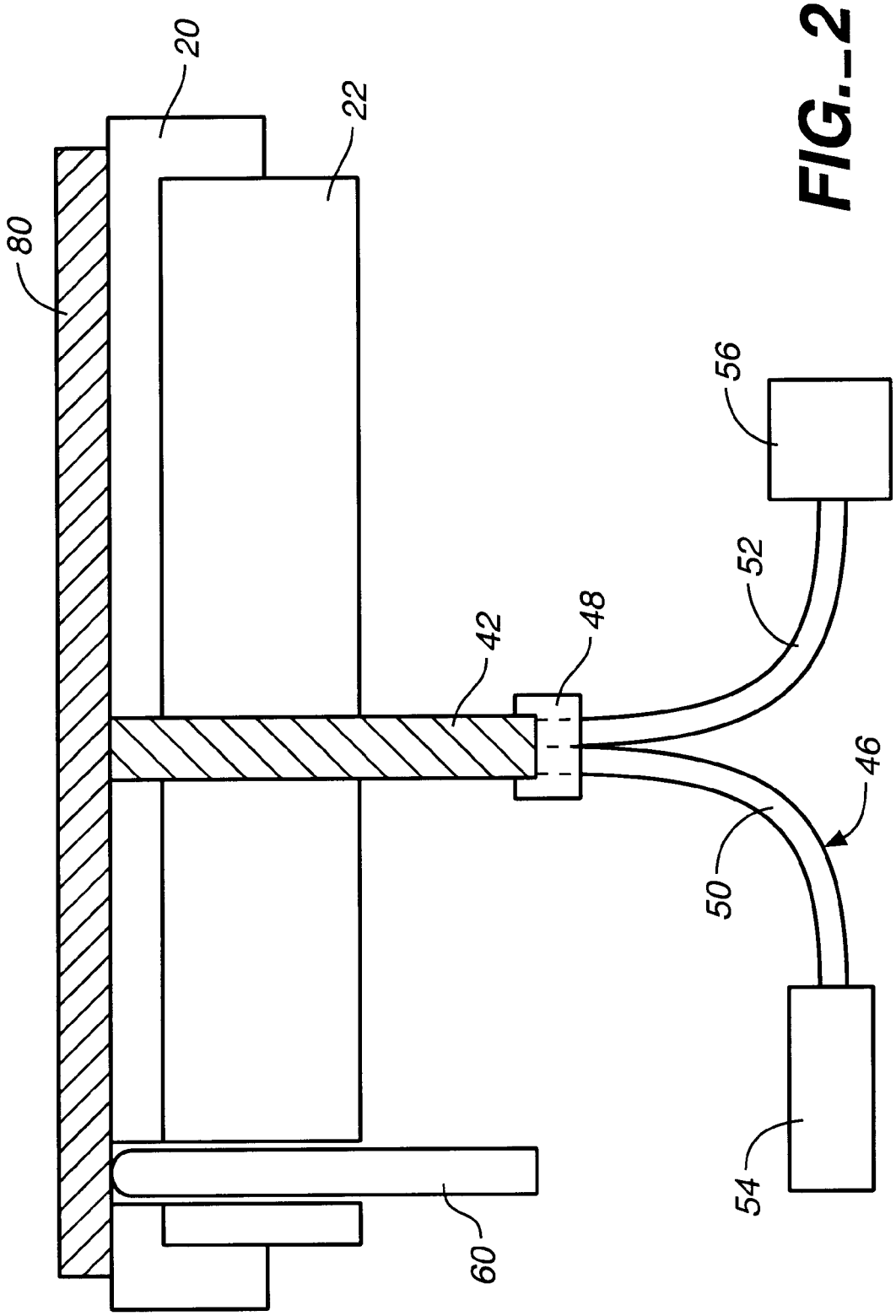
FIG._2

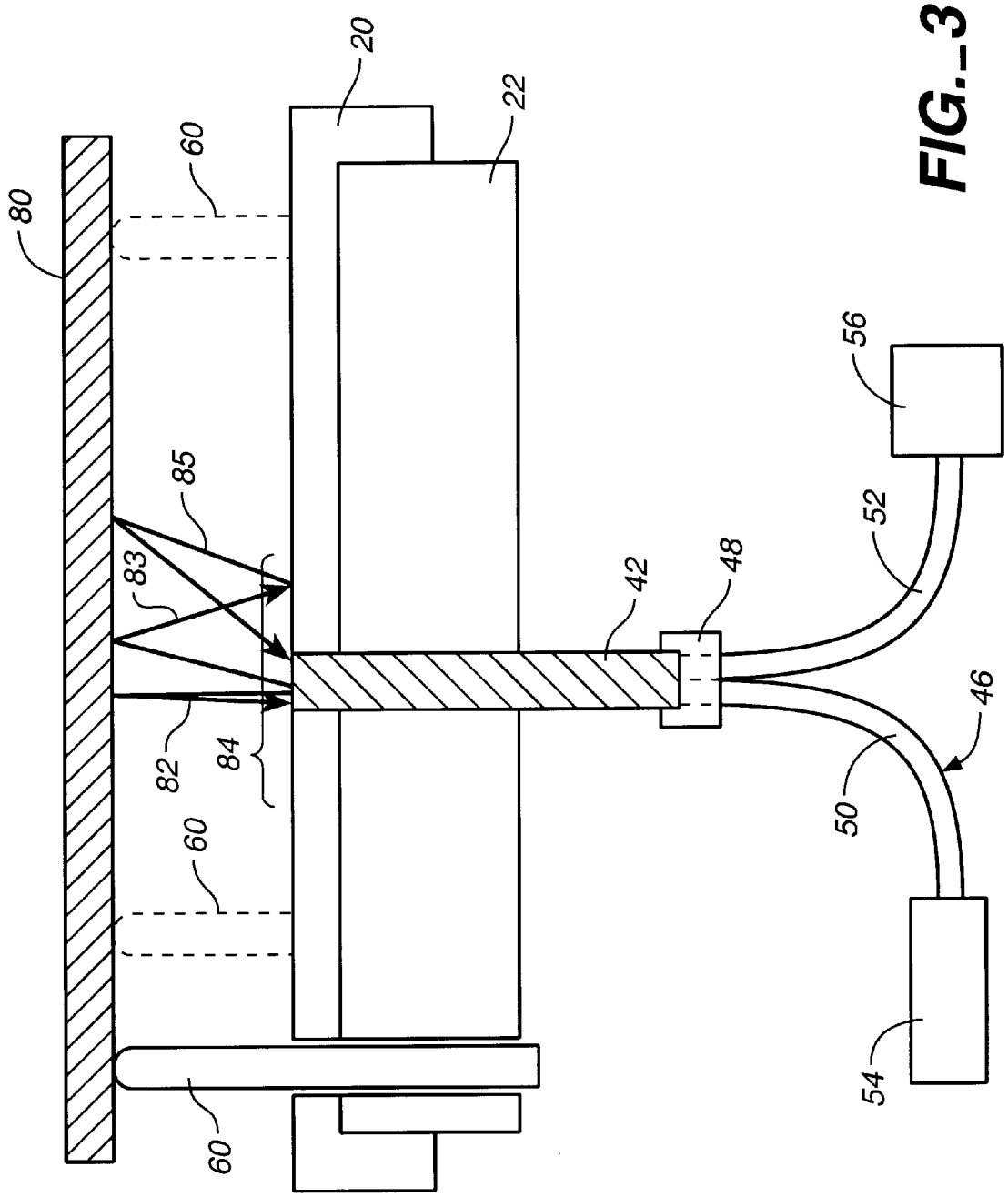
FIG._3

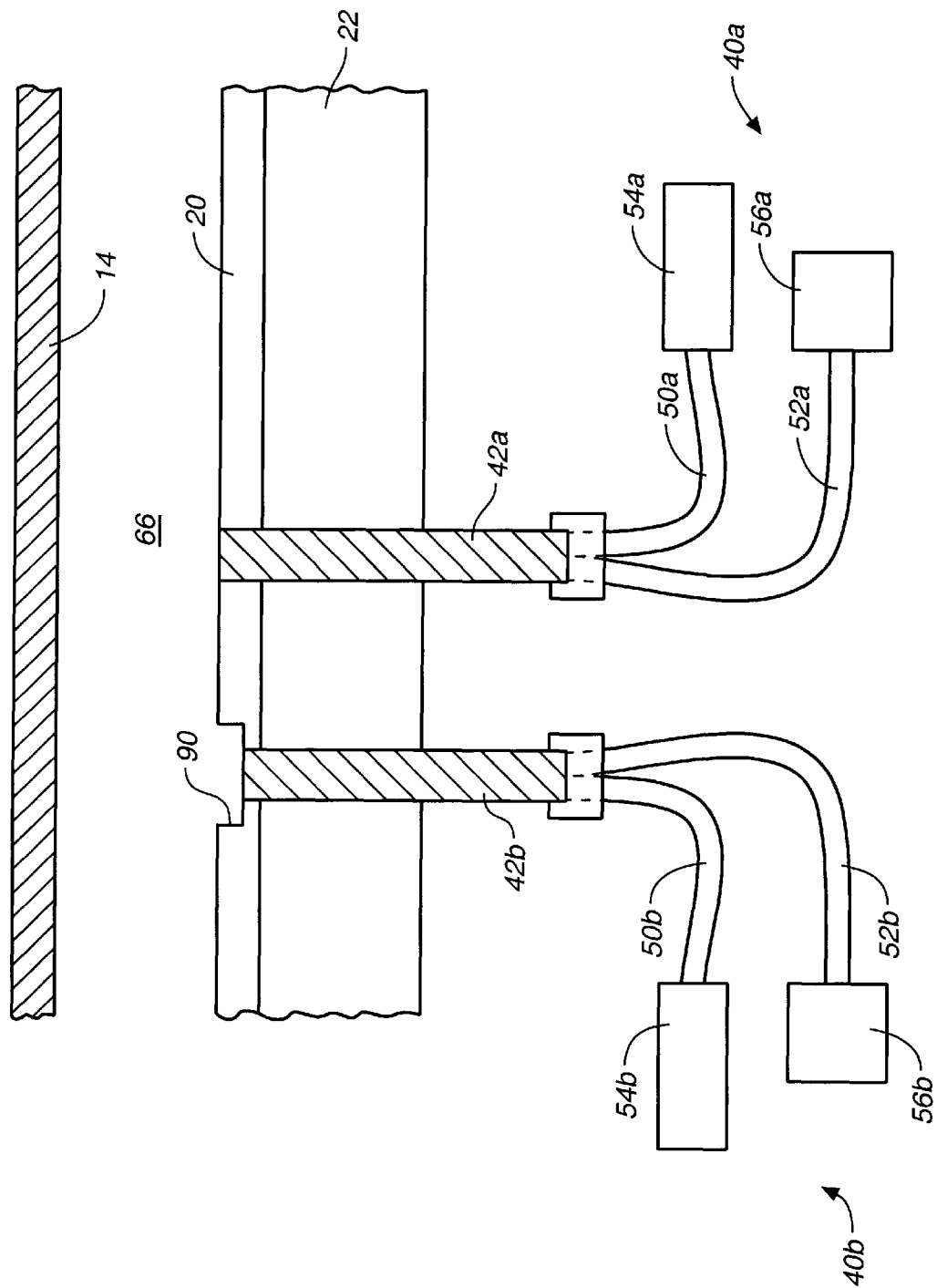

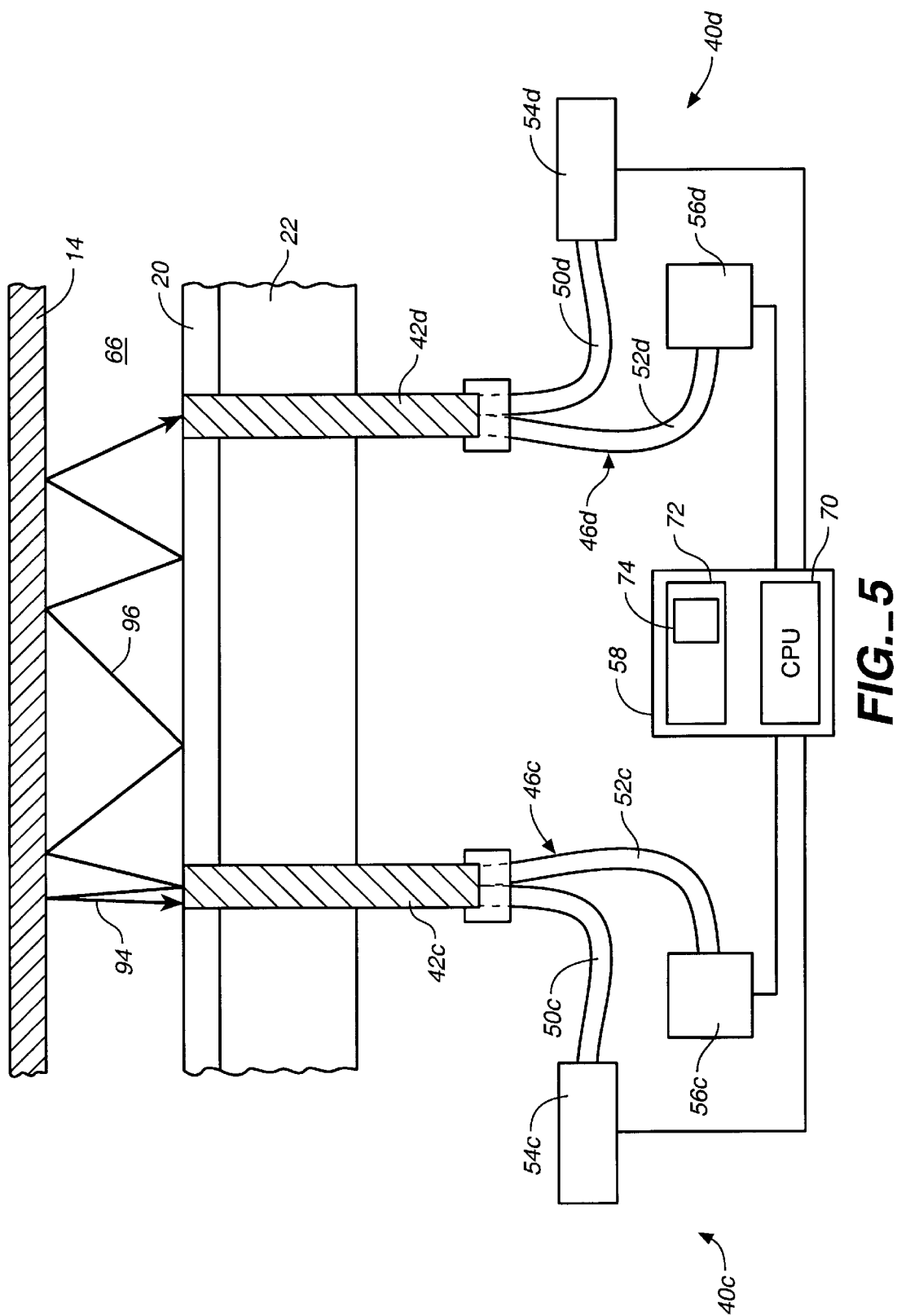
FIG._5

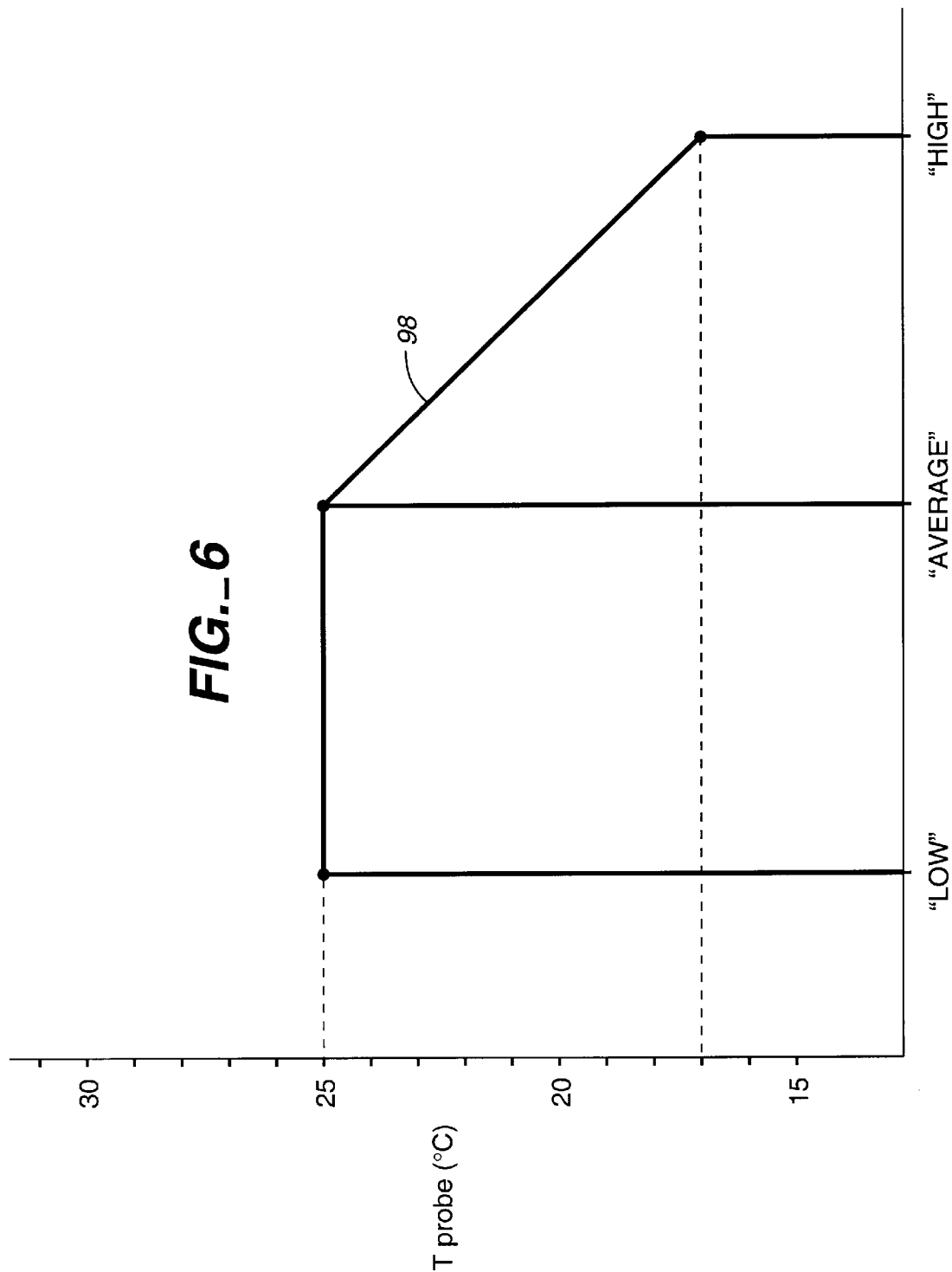
FIG._6

SELF-CALIBRATING TEMPERATURE PROBE

BACKGROUND OF THE INVENTION

The present invention relates to self-calibrating temperature probes that are used in thermal processing systems.

In rapid thermal processing (RTP), a substrate is heated quickly and uniformly to a high temperature, such as 400° C. to 1200° C., to perform a fabrication step such as annealing, cleaning, chemical vapor deposition, oxidation, or nitration. For example, a thermal processing system, such as the RTP tool available from Applied Materials under the trade name "Centura", may be used to perform metal annealing at temperatures of 400° C. to 500° C., titanium silicide formation at temperatures around 650° C., or oxidation or implant annealing at temperatures around 1000° C.

The temperature of the substrate must be precisely controlled during these thermal processing steps to obtain high yields and process reliability, particularly given the submicron dimension of current devices. For example, to fabricate a dielectric layer 60–80 Å thick with a uniformity of ±2 Å (a typical requirement in current device structures), the temperature in successive processing runs cannot vary by more than a few °C. from the target temperature. To achieve this level of temperature control, the temperature of the substrate is measured in real time and in situ.

Optical pyrometry is a technology that is used to measure substrate temperatures in RTP systems. In optical pyrometry, a light pipe of a temperature probe samples the radiation emitted from the substrate, and a pyrometer computes the temperature of the substrate based on the intensity of the sampled radiation, the spectral emissivity of the substrate, and the ideal blackbody radiation-temperature relationship.

Assuming the temperature probe is initially calibrated to produce a correct temperature reading, repeated use may cause the temperature sensed by the probe to change over time. For example, the light pipe may become dirty or chipped, the electronic components in the pyrometer may "drift", or the connections along the optical path from the light pipe to the pyrometer may loosen. Thus it will be necessary to recalibrate the probe or at least detect the change that has occurred so that corrective action can be taken.

Even if the temperature probe remains calibrated, the processing chamber may change and introduce an error into the measured temperature of the substrate. One common component of the processing chamber is a reflector plate positioned beneath the substrate to form a reflecting cavity therebetween. This reflector plate causes radiation from the substrate to be reflected back to the substrate. It can be shown that if the reflector plate were an ideal reflector, all of the radiation emitted by the substrate would be reflected back to the substrate, and the reflecting cavity would act like an ideal black body. That is, the reflector plate affects the effective emissivity of the substrate.

As a result of processing operations, the reflector plate may become dirty or corroded, and thus less reflective. If the reflectivity of the reflector plate changes, the effective emissivity of the substrate also changes. The variation in the effective emissivity of the substrate changes the intensity of the radiation sampled by the temperature probe, and creates an error in the measured temperature. One method of detecting changes in the reflector plate is visual inspection (either by the human eye or under microscope). To provide access for visual inspection of the reflector plate, the processing chamber is opened.

Another obstruction to the accurate measurement of substrate temperatures is the differences in roughness between substrates. The roughness of the substrate can affect the intensity of the light sampled by the temperature probe. Because in situ determination of the roughness of a substrate has, as yet, been impractical, the pyrometer computes the substrate temperature as if each substrate had the same roughness.

SUMMARY OF THE INVENTION

In general, in one aspect, the invention features an apparatus for calibrating a substrate processing system. In the invention, the input end of a probe is configured to sample light from a processing chamber. The output end of the probe is connected to a trunk of a split fiber optic guide. A light source is optically coupled to one branch of the guide, and a sensor is optically coupled to another branch.

Implementations of the invention may feature the following. The processing chamber may include a reflector plate, and the probe may extends through a passageway in the reflector plate. A body having a known reflectivity may be configured to fit in the processing chamber and either rest on or be suspended above the reflector plate.

In general, in another aspect, the invention features a method of calibrating a substrate processing system. In the invention, light from a light source shines into a first branch of a split optical fiber, the trunk of which is optically connected to a probe. Light is injected through the probe into a processing chamber, and is reflected from a reflective body in the processing chamber. The reflected light is sampled with the probe, and the intensity of the sampled light is measured with a sensor optically coupled to a second branch of the split optical fiber.

Among the advantages of the invention are the following. The temperature probe may be accurately calibrated, i.e., changes in the light pipe, in the light path from the light pipe to the pyrometer, and in the pyrometer, may be easily detected. Calibration may be performed quickly, without using a wafer with an embedded thermocouple, and without removing the light pipe from the chamber. Changes in the reflector plate may easily be detected without opening the processing chamber and more accurately than visual inspection. Both the emissivity and roughness of the substrate may be determined and used in computation of the substrate temperature.

BRIEF DESCRIPTION OF THE DRAWING

FIG. 1 shows a rapid thermal processing system;

FIG. 2 shows a self-calibrating temperature sensing apparatus;

FIG. 3 shows an apparatus which detects changes in a rapid thermal processing chamber;

FIG. 4 shows an apparatus for measuring the emissivity of a substrate;

FIG. 5 shows an apparatus for measuring the both emissivity and the roughness of substrate; and FIG. 6 is a graph of the difference in temperature measurements by two temperature probes as a function of the roughness of a substrate.

DESCRIPTION OF THE PREFERRED EMBODIMENTS

Referring to FIG. 1, an RTP system 10 includes a processing chamber 12 for processing an eight-inch diameter disk-shaped silicon substrate 14. Inside chamber 12, substrate 14 is rapidly and evenly heated to an elevated temperature (e.g., about 1000° C.) and may be subjected to various processing steps such as annealing, cleaning, chemical vapor deposition, etching, oxidation, or nitration.

The substrate 14 is supported by a rotating support ring 16 about half an inch above a reflector plate 20. The reflector plate 20 includes an aluminum body coated with a thin, highly reflective layer (e.g., gold). The reflector plate 20 is mounted on a stainless steel base 22. Coolant liquid circulates through passages 24 in base 22 to control the temperature of the base and the reflector plate.

Substrate 14 is heated by a heating element 30, such as a water-cooled array of tungsten-halogen lamps. Radiant energy from heating element 30 passes through a quartz window 32, located about one inch directly above the substrate, to quickly and uniformly heat the substrate to an elevated temperature. The heating element may be constructed as described in U.S. Pat. No. 5,155,336, the entirety of which is hereby incorporated by reference.

A plurality of self-calibrating temperature probes 40 (e.g., eight, although only three are shown in FIG. 1) are positioned below the substrate to accurately measure its temperature at different substrate radii during the processing operation. Each self-calibrating temperature probe 40 (one of which is enclosed by a dashed line in FIG. 1) includes a sapphire light pipe 42, about 0.05 to 0.125 inches in diameter, which extends through a conduit 44 from the backside of base 22 to the top of reflector plate 20. The sapphire light pipe acts as the input of a temperature sensing system and also, when probe 40 is performing a self-calibration, as the output of a light source. One end of light pipe 42 is located near, e.g., flush with, the top of reflector plate 20 to sample radiation from chamber 12 or to inject light into chamber 12. The other end of the light pipe is optically coupled to, e.g., held in close contact with, a split fiber optic guide 46. The split fiber optic guide has a "trunk" portion, a source branch 50, and a sampling branch 52. The trunk of split fiber optic guide 46 is coupled to light pipe 42 by a connector 48, such a bifurcated connector available from 3M Inc., of Minneapolis, Minn. The split fiber optic guide 46 may be constructed of two separate optical fibers inserted individually into the connector. Alternately, split fiber optic guide 46 may be a commercially available fiber bundle, which has been divided into two branches.

A light source 54 having an extremely stable intensity is connected to source branch 50, and a temperature sensing system 56 is connected to sampling branch 52. Light source 54 may be a one-hundred milliwatt laser which has its output intensity controlled by a photodiode. The light source generates radiation in the spectral range that is detected by the temperature sensing system. Temperature sensing system 56 may be a pyrometer, such as a Luxtron Accufiber Model#100. A controller 58, such as a programmed digital computer, activates light source 54 and stores measurements by pyrometer 56. In one embodiment, every light source and sensor is connected to a single controller 58 (see FIG. 5).

When light source 54 is activated, light passes through source branch 50 and is injected by light pipe 42 into processing chamber 12. If there is a reflective object, e.g., a wafer, in the processing chamber, then a portion of the injected light will be reflected back into light pipe 42. Although part of the reflected light will return through source branch 50 at connector 48, the remainder, e.g., half, of the reflected light will enter sampling branch 52. Pyrometer 56 measures the intensity of the reflected light in sampling branch 52, and converts the measured intensity into an equivalent black-body temperature.

On the other hand, if there is no object in processing chamber 12, then the injected light is not reflected directly back into light pipe 42. Instead, the injected light ricochets about the chamber until it is absorbed by the non-reflective surfaces therein. Some small amount of this ricocheted light may be sampled by light pipe 42. Therefore, if there is no object in processing chamber, pyrometer 56 should measure nearly zero light intensity when light source 54 is activated.

The RTP system 10 includes a lift mechanism for lowering the substrate onto support ring 16 prior to processing and lifting the substrate off the support ring after processing. The lift mechanism includes three or more lift pins 60 which pass through vertical lift pin holes 62 in base 22 and reflector plate 20 to contact the substrate (only one lift pin is shown in FIG. 1 due to the cross-sectional view). The lift pins 60 travel vertically to extend past support ring 16, or the lift pins retract to be flush with reflector plate 20.

In a typical rapid thermal processing operation, substrate 14 is carried into chamber 12 by a blade (not shown), the substrate is raised off the blade by lift pins 60, the blade retracts, and the substrate is lowered by the lift pins onto support ring 16. Once substrate 14 is in place on support ring 16, the underside of the substrate and the top of reflector plate 20 form a reflecting cavity 66 which makes the substrate appear more like an ideal black body, i.e., it produces an increased effective emissivity for the substrate in the spectral range in which a black body would radiate energy.

The self-calibrating temperature probe of RTP system 10 is used to measure the temperature of the substrate during the processing operation, i.e., while heating element 30 is active and substrate 14 is at an elevated temperature. The hot substrate generates radiation, e.g., infrared radiation, which is sampled by the light pipe of each self-calibrating temperature probe. Part of the light sampled by light pipe 42 passes through sampling branch 52 of split fiber optic guide 46 and into pyrometer 56. The pyrometer computes the temperature of substrate 14 from the intensity of radiation sampled by light pipe 42. A more complete explanation of an RTP system, along with an explanation of how reflecting cavity 66 acts to produce a virtual black body, may be found in U.S. patent application Ser. No. 08/359,302, filed Dec. 19, 1994, and incorporated herein by reference. Light source 54 is not activated to measure the temperature of the substrate.

To ensure that self-calibrating temperature probe 40 produces an accurate temperature measurement, an initial absolute calibration is carried out as described in U.S. patent application Ser. No. 08/506,902 filed Jul. 26, 1995, and incorporated herein by reference. In brief, a calibration instrument having a stable light source injects a known amount of radiation into light pipe 42 and thereby simulates a black-body of a predetermined temperature. Part, e.g., half, of the light injected into light pipe 42 passes through sampling branch 52 of split fiber optic guide 46 and enters pyrometer 56. Pyrometer 56 is then tuned to match the predetermined simulated temperature of the calibration instrument.

The self-calibrating temperature probe also calibrates itself, i.e., detects changes in system components, e.g., pyrometer 56, split fiber optic guide 46, and light pipe 42, following the initial absolute calibration described above. Referring to FIG. 2, each time that probe 40 is to be self-calibrated, e.g., once or twice a month, or more often if desired, a reflective object 80 of stable reflectivity, e.g., a gold plated wafer, is placed into chamber 12. Reflective object 80 is partially diffuse, i.e., it scatters some incident light. The lift pins 60 retract so that the reflective object rests directly on reflector plate 20. The light source 54 is activated, and light passes through source branch 50 into light pipe 42. However, instead of passing into chamber 12, the light is reflected from reflective object 80 directly back into light pipe 42. Part of the light then passes through sampling branch 52 and into pyrometer 56.

The intensity measurement by pyrometer 56 is compared to prior measurements which may be stored in controller 58. Because reflective object 80 is stable and light source 54 is stable, any changes in the intensity of the reflected light must be the result of changes in light pipe 42, split fiber optic guide 46, or pyrometer 56. If changes are detected, corrective action can be taken, e.g., the light pipe can be cleaned, the connection between the light pipe and split fiber optic guide tightened, etc., or pyrometer 56 can be recalibrated. Although calibration may be conducted manually, controller 58 is programmed to store the prior measurements and compare the new measurements to the stored measurements to detect changes.

As described above, self-calibration requires the detection and measurement of changes in the amount of light reflected from reflective object 80. Extraneous light, i.e., light that enters pyrometer 50 from sources other than reflection from reflective object 80, interferes with the detection by pyrometer 56 of small changes in the amount of reflected light. For example, the extraneous light may "wash out" the reflected light; that is, the extraneous light may be so strong as to make detection of the small changes in reflected light difficult or impossible.

One source of extraneous light is signal coupling; light from source 54 may be reflected at connector 48 directly from source branch 50 into sampling branch 52. For example, if there is a small air gap between split fiber optic guide 46 and light pipe 42, then light passing out of the split fiber optic guide will be reflected back into the guide at the air-glass interface. Some of the light reflected at the air-glass interface may pass through sampling branch 52 and into pyrometer 56. Signal coupling increases the extraneous light entering pyrometer 56, thereby making the calibration by self-calibrating temperature probe 40 less reliable. To reduce signal coupling at connector 48, the optical fibers of source branch 50 and sampling branch 52 need to be carefully aligned to be parallel with the light pipe and kept physically separate at connector 48. With this or similar precautions, light which is reflected at the air-glass interface will only be reflected into the source branch 50, and not into the sampling branch 52.

The self-calibrating temperature probe may also calibrate, i.e., detect changes in, reflector plate 20 by "viewing", i.e., receiving light from, the reflector plate. Referring to FIG. 3, after self-calibrating temperature probe 40 has been calibrated, the lift pins raise reflective object 80 to the same elevation that a substrate would be held by support ring 16 during processing. Light source 54 is activated, and light is injected from light pipe 42 into chamber 12. Because reflective object 80 has been raised above reflector plate 20, a portion of the light (e.g., shown by ray 82) is reflected directly back into light pipe 42, and the rest of the light (e.g., shown by a light ray 83) is reflected back at a circular area 84 surrounding the light pipe. As previously discussed, the reflective object is partially diffuse, i.e., it scatters light. Some of the light reflected by area 84 of the reflector plate (e.g., shown by a light ray 85 in FIG. 3) will be scattered back into light pipe 42 by reflective object 80. Therefore, the total light intensity measured by pyrometer 56 depends upon the reflectivity of the area of the reflector plate surrounding light pipe 42. The light reflected by area 84 and scattered back into light pipe 42 is measured to detect changes in the reflector plate.

To calibrate reflector plate 20, the intensity measurement by pyrometer 56 is compared to prior measurements. Because the light source, reflective object, and temperature probe are known to be stable, any changes in the measured signal must be due to changes in reflector plate 20. If changes in the reflectivity of the reflector plate are detected, corrective action can be taken, e.g., the reflector plate can be cleaned, polished, or replaced.

In addition to calibrating themselves and the reflector plate, the self-calibrating temperature probes may be used to measure the emissivity and roughness of an unknown substrate during processing. The emissivity and roughness measurements may be used to correct for inaccuracies in the temperature measurements caused by the difference between the substrate and a perfect black body radiation source.

Referring to FIG. 4, with light sources 54a and 54b inactive, two neighboring self-calibrating temperature probes 40a and 40b, if close enough, can be used to take independent measurements of the temperature of the same region of substrate 14. As described in aforementioned U.S. patent application Ser. No. 08/359,302, the surface of reflector plate 20 surrounding light pipe 42a may be flat, whereas light pipe 42b may be positioned at the bottom of a depression 90. The different physical structures cause light pipes 42a and 42b to receive different amounts of light from substrate 14. Therefore, although light pipes 42a and 42b collect light from the same region of the substrate, pyrometer 56b of self-calibrating temperature probe 40b generates a temperature measurement $T_2$, and pyrometer 56a of self-calibrating temperature probe 40a generates a different temperature measurement $T_1$. The difference between $T_1$ and $T_2$, i.e., $\Delta$Tprobe, is used to compute the actual emissivity of the substrate and thereby correct for the differences in emissivity between the substrate and a black body. Specifically, the corrected temperature of the substrate $T_{corr}$ is given by the equation:

$$T_{corr} = T + K_{corr} \cdot \Delta \text{Tprobe} \qquad (1)$$

where T is the temperature measured by any pyrometer having the same configuration as pyrometer 40a, and $K_{corr}$ is a correction factor calculated as described in U.S. patent application Ser. No. 08/359,302. Although the technique described therein for calculating the correction factor $K_{corr}$ corrects for differences in emissivity between substrates, it assumes that all substrates have the same roughness.

In practice, however, there are substrates having the same emissivity but different roughness. The difference in effective emissivity caused by the physical structures in reflector plate 20 surrounding the light pipes will depend on the roughness of the substrate. Specifically, more light enters a light pipe positioned in a depression, e.g., light pipe 42b, from a diffuse, i.e., rough, substrate than a specular, i.e., smooth, substrate. Therefore, the measured $\Delta$Tprobe for a specular substrate is larger than the measured $\Delta$Tprobe for a diffuse substrate. If the roughness of the substrate is not known, a small uncertainty is introduced into $\Delta$Tprobe and thus into the measured temperature of the substrate. However, as described below, the self-calibrating temperature probes in RTP system 10 may be used to determine the roughness of the substrate and eliminate this uncertainty.

Referring to FIG. 5, light source 54c of self-calibrating temperature probe 40c is activated to inject light through emitting light pipe 42c into reflecting cavity 66. Some of the injected light (e.g., shown by a light ray 94) is reflected back into emitting light pipe 42c. A portion of the light sampled by light pipe 42c passes through sampling branch 52c and is measured by pyrometer 56c.

However, some of the injected light (e.g., shown by a light ray 96), is reflected back and forth between the substrate and the reflector plate until it reaches light pipe 42d of self-calibrating temperature probe 40d. A portion of the light sampled by light pipe 42d passes through sampling branch 52d of split fiber optic guide 46d and enters pyrometer 56d. Pyrometers 56c and 56d make intensity measurements $I_1$ and $I_2$, respectively. Light source 54d of self-calibrating temperature probe 40d remains off. Light pipes 42a and 42b (shown in FIG. 5) need to be positioned close together to sample radiation from the same region of the substrate, whereas light pipes 42c and 42d should be separated. Thus one, but not both, of the self-calibrating temperature probes 40c and 40d may also be used as self-calibrating temperature probe 40a or 40b to measure ΔTprobe as described above.

Because the measurement of the roughness of substrate 14 occurs during the rapid thermal processing operation, the substrate is at an elevated temperature and is radiating energy. Therefore, a sufficiently powerful light source 54c is selected so that the radiation reaching light pipe 42d from the light source is not washed out by radiation from the substrate. As noted above, light source 54c may be a one-hundred milliwatt laser.

Controller 58 compares the time at which pyrometers 56c and 56d take measurements with the time at which light source 54c is active. Measurements taken when the light source is active are used to calculate the roughness of the substrate, whereas measurements taken when light source is inactive are used to calculate the temperature of the substrate. It is important that light source 54c not be activated when the pyrometers are measuring the temperature of substrate 14, otherwise the pyrometers will sample the combined total of the radiation from the substrate and the light source, and generate incorrect temperature measurements.

It is possible to use light intensity measurements $I_1$ and $I_2$ to calculate the emissivity and roughness of an substrate. The light intensity $I_1$ sampled by the emitting light pipe 42c depends more on the emissivity of substrate 14, whereas the light intensity $I_2$ sampled by the non-emitting light pipe 42d depends more on the roughness of the substrate. Therefore, it is possible to determine both the emissivity and roughness of the substrate from the following equations:

$$\text{Emissivity } (E) = f_1(I_1, I_2) \quad (2)$$
$$\text{Roughness } (R) = f_2(I_1, I_2) \quad (3)$$

The functions $f_1$ and $f_2$ will depend upon the specific chamber shape and pyrometer positions, and must be determined experimentally.

Functions $f_1$ and $f_2$, each of which may be represented by a two-dimensional matrix, convert measured intensities $I_1$ and $I_2$ into an emissivity E or a roughness R. The functions are determined experimentally by measuring the intensities $I'_1$ and $I'_2$ of substrates with known emissivity E' and roughness R'. Each substrate has a different combination of emissivity and roughness. The values $I'_1$, $I'_2$, E' and R' for each substrate are stored, e.g., in a computer memory. During a processing operation, the unknown value, e.g., the roughness R, is generated by interpolation, i.e., R is calculated as a weighted average of the values of R' at the three or four intensity pairs $I_1$ and $I_2$ that are closest to the measured intensity pair $I_1$ and $I_2$.

One may use the measured roughness and emissivity to generate a mapping function which is used to correct ΔTprobe, and the corrected value of ΔTprobe may be used in Equation 1 to generate an accurate measurement of the substrate temperature. Referring to FIG. 6, there is a graph showing ΔTprobe (shown by solid line 98) as function of substrate roughness R. This graph was empirically determined by measuring ΔTprobe for three substrates having the same emissivity but different roughnesses, and may be used to compute a corrective value for ΔTprobe. In particular, ΔTprobe may be multiplied by a corrective value $V_C$ so that it matches the ΔTprobe which would be generated by a substrate of "normal" roughness, i.e., the roughness that was assumed when calculating the correction factor $K_{corr}$. The corrective value $V_C$ is generated by dividing the empirically measured ΔTprobe of a substrate of "normal" roughness by the empirically measured ΔTprobe of a substrate having the measured roughness R. A linear scaling function may be used to approximate the correction value $V_C$ for a substrate of intermediate roughness. Thus, the corrected temperature of the substrate $T_{corr}$ is given by the equation:

$$T_{corr} = T + K_{corr} \cdot \Delta Tprobe \cdot V_C \quad (4)$$

For example, if substrate 14 is rougher than normal, then the measured ΔTprobe will be smaller than normal, and therefore the measured ΔTprobe must be increased to generate the correct ΔTprobe. Specifically, if the roughness of substrate 14 is "high", ΔTprobe is multiplied by a corrective value $V_C$ of 25/17 to determine the proper ΔTprobe to use when computing the corrected temperature $T_{corr}$.

Controller 58 is used to generate an accurate measurement of the substrate temperature which takes into account the roughness of the substrate. Referring to FIG. 5, controller 58 is a general purpose programmable digital computer with a central processing unit (CPU) 70 and a memory 72. The program of controller 58 may be implemented as a computer program 74 executed by CPU 70 from memory 72, as shown in FIG. 5, or in a hardware structure, such as an application-specific integrated circuit (an ASIC), or in a hybrid structure.

In general, for each probe 40, controller 58 can activate and deactivate light source 56, receive and store temperature indications from sensor 56, and calculate a corrected temperature measurement. Controller 58 begins by receiving temperature indications $T_1$ and $T_2$ from probes 40a and 40b. Controller 58 calculates ΔTprobe, and stores $T_1$, $T_2$, and ΔTprobe in memory 72. Then controller 58 activates light source 59c, and stores intensity measurements $I_1$ and $I_2$ from probes 40c and 40d. Controller 58 calculates the roughness R of the substrate from intensity measurements $I_1$ and $I_2$, and from the roughness R and the previously measured mapping function 98, controller 58 calculates the corrective value $V_C$. Then controller 58 deactivates light source 54c and retrieves a temperature measurement T. Temperature measurement T may be the temperature indication $T_1$ from probe 40a, or it may be a temperature indication from another probe. Finally, controller 58 uses T, ΔTprobe, $K_{corr}$, and $V_C$, to calculate the corrected temperature $T_{corr}$ according to Equation 4.

What is claimed is:

1. An apparatus for calibrating a substrate processing system, comprising:

an optical guide with an input end and an output end, the input end configured to sample light from a processing chamber that includes a reflector plate, wherein the optical guide extends through a passageway in the reflector plate;

a split optical fiber having a trunk and first and second branches, the trunk optically coupled to the output end of the optical guide;

a light source optically coupled to the first branch; and a sensor optically coupled to the second branch.

2. The apparatus of claim 1 further comprising a body having a known reflectivity configured to fit in the processing chamber.

3. The apparatus of claim 2 wherein the body rests on the reflector plate.

4. The apparatus of claim 2 wherein the body is suspended above the reflector plate.

5. The apparatus of claim 1 further comprising a controller programmed to derive a temperature measurement from the sensor.

6. The apparatus of claim 5 wherein the controller is programmed to activate the light source and derive the temperature measurement when the light source is activated.

7. The apparatus of claim 6 wherein the controller is programmed to compare the derived temperature measurement to a stored temperature measurement to calibrate the apparatus.

8. A method of calibrating a substrate processing system, comprising the steps of:

injecting light from a light source through a first branch of a split optical fiber, a trunk of the split optical fiber optically connected to an optical guide that extends through a passageway in a reflector plate, and through the optical guide into a processing chamber;

reflecting injected light from a reflective body in the processing chamber;

sampling reflected light via the optical guide; and measuring an intensity of sampled light using a sensor optically coupled to a second branch of the split optical fiber.

9. The method of claim 8 further comprising positioning the body on the reflector plate.

10. The method of claim 8 further comprising suspending the body above the reflector plate.

11. An apparatus for determining a corrected temperature of a body in a substrate processing system, comprising:

a first optical guide having an input end and an output end, the input end of the first optical guide positioned to sample light reflected from the body;

a first split optical fiber having a trunk and first and second branches, the trunk of the first optical fiber optically coupled to the output end of the first optical guide;

a first light source optically coupled to the first branch of the first split optical fiber;

a first sensor optically coupled to the second branch of the first split optical fiber;

a second optical guide having an input end and an output end, the input end of the second optical guide positioned to sample light reflected from the body;

a second sensor optically coupled to the output end of the second optical guide; and a controller programmed to activate the first light source, receive first and second temperature indications from the first and second sensors when the first light source is activated, and derive a temperature correction factor from the first and second temperature indications.

12. The apparatus of claim 11 further comprising a second split optical fiber having a trunk and first and second branches, the trunk of the second optical fiber optically coupled to the output end of the second optical guide, and a second light source optically coupled to the first branch of the second split optical fiber, and wherein the second sensor is optically coupled to the second branch of the second split optical fiber.

13. The apparatus of claim 12 wherein the controller is programmed so that the second light source is not activated while the second sensor generates the second temperature indications.

14. The apparatus of claim 11 further comprising a third optical guide having an input end and an output end, the input end of the third optical guide positioned to sample light reflected from the body, and a third sensor optically coupled to the output end of the third optical guide.

15. The apparatus of claim 14 wherein the controller is further programmed to receive a third intensity indication from one of the first, second, and third sensors when the first light source is not activated, and to derive a temperature measurement from the third intensity indication and the temperature correction factor.

16. The apparatus of claim 15 wherein the controller is programmed to derive the temperature correction factor by using the first and second temperature indications to compute a roughness for the body and using the roughness to compute the temperature correction factor.

17. A method of determining a property of a body in a substrate processing chamber, comprising the steps of:

shining light from a light source into a first branch of a first split optical fiber, a trunk of the first split optical fiber optically coupled to a first optical guide;

injecting light through the first optical guide into the processing chamber;

sampling light that was infected through the first optical guide and reflected by the body with the first optical guide;

measuring a first intensity of light sampled by the first optical guide using a first sensor optically coupled to a second branch of the first split optical fiber;

sampling light that was injected through the first optical guide and reflected by the body with a second optical guide;

measuring a second intensity of light sampled by the second optical guide using a second sensor optically coupled to the second optical guide; and deriving a measurement of the property from the first and second intensities.

18. The method of claim 17 wherein the property determined is roughness.

19. The method of claim 18 further comprising comparing the first and second intensities of light to third and fourth intensities of light previously measured for a substrate of known roughness.

20. The method of claim 17 wherein the property determined is emissivity.

21. The method of claim 20 further comprising comparing the first and second intensities of light to third and fourth intensities of light previously measured for a substrate of known emissivity.

22. A substrate processing system comprising:

a reflector plate in a process chamber;

a substrate support to hold a substrate in the chamber so as to form a reflective cavity between the reflector plate and the substrate;

a heater to heat the substrate;

an optical guide having an input end and an output end, the input end of the optical guide extending through a passage in the reflector plate to sample light from the reflective cavity;

a split optical fiber having a trunk and first and second branches, the trunk optically coupled to the output end of the optical guide;

a light source optically coupled to the first branch; and a sensor optically coupled to the second branch.

23. A method of correcting a temperature measurement of a substrate in a processing chamber, comprising the steps of:

inserting a substrate into a chamber;

heating the substrate in the chamber;

measuring a temperature and a roughness of the substrate in the chamber with a plurality of probes; and using the roughness of the substrate to derive a corrected temperature measurement.

24. The method of claim 23 wherein the roughness is measured by a pair of probes and the temperature is measured with one of the pair of probes.

25. The method of claim 23 wherein the roughness is measured by a first probe and a second probe and the temperature is measured by a third probe.

26. The method of claim 23 wherein the roughness is measured with a first pair of probes, and further comprising generating first and second temperature indications from a second pair of probes, determining a temperature difference between the first and second temperature indications, adjusting the temperature difference by a correction factor that is derived from the roughness of the substrate, and correcting the measured temperature by adding a correction quantity that is derived from the adjusted temperature difference.

27. An apparatus for measuring the temperature of a substrate in a substrate processing chamber, comprising:

a light source for injecting light into the processing chamber;

a first probe and a second probe for measuring first and second intensities, respectively, of injected light when the light source is activated;

a third probe for generating a temperature indication when the light source is not activated; and a controller programmed to activate the light source, to receive the temperature indication from the third probe, to receive the first and second intensities from the first and second probes, to derive a temperature correction factor from the first and second intensities, and to derive a corrected temperature by using the temperature indication and the temperature correction factor.

28. The apparatus of claim 27, wherein at least one of the first and second probes samples light that is injected from another probe.

29. The apparatus of claim 28, wherein the one probe is the first probe and the another probe is the second probe.

30. An apparatus for measuring a property of a body in a substrate processing system, comprising:

a first optical guide having an input end and an output end, the input end of the first optical guide positioned to sample light reflected from the body;

a first split optical fiber having a trunk and first and second branches, the trunk of the first optical fiber optically coupled to the output end of the first optical guide;

a first light source optically coupled to the first branch of the first split optical fiber;

a first sensor optically coupled to the second branch of the first split optical fiber;

a second optical guide having an input end and an output end, the input end of the second optical guide positioned to sample light reflected from the body;

a second sensor optically coupled to the output end of the second optical guide; and a controller programmed to activate the first light source, receive first and second intensity indications from the first and second sensors when the first light source is activated, and derive a measurement of the property from the first and second intensity indications.

31. A method of calibrating a substrate processing system, comprising the steps of:

placing a body having a substantially stable reflectivity in a processing chamber;

injecting light from a light source through a first branch of a split optical fiber, a trunk of the split optical fiber optically connected to an optical guide, and through the optical guide into a processing chamber;

sampling light that was injected through the optical guide and reflected from the body via the optical guide;

measuring a first intensity of light sampled by the optical guide using a sensor optically coupled to a second branch of the split optical fiber; and comparing the first intensity to a second intensity of light previously sampled by the optical guide when the body was in the processing chamber to detect changes in the processing system.

32. The method of claim 31 wherein the processing chamber includes a reflector plate, and the optical guide extends through the reflector plate.

33. The method of claim 32 further comprising positioning the body on the reflector plate to detect changes in the light source, optical fiber, or optical guide.

34. The method of claim 32 further comprising suspending the body above the reflector plate to detect changes in the processing chamber.

35. The method of claim 31 further comprising correcting a measured temperature based on the detected change in the processing system.

36. An apparatus for calibrating a substrate processing system, comprising:

an optical guide with an input end and an output end, the input end configured to sample light from a processing chamber;

a split optical fiber having a trunk and first and second branches, the trunk optically coupled to the output end of the optical guide;

a light source optically coupled to the first branch;

a sensor optically coupled to the second branch; and a controller configured to activate the light source when a body having a substantially stable reflectivity is positioned in the processing chamber and to derive a first intensity of light sampled by the optical guide, to store a second intensity of light previously sampled by the optical guide when the body was in the processing chamber, and to compare the first intensity to the second intensity to detect changes in the processing system.

37. The method of claim 23, wherein measuring the temperature and the roughness of the substrate includes sampling light that was injected through a first probe and reflected by the body with the first probe, measuring a first intensity of light sampled by the first probe, sampling light that was injected through the first probe with a second probe, and measuring a second intensity of light sampled by the second optical probe.

38. The method of claim 23, wherein each probe includes an optical guide with an input end and an output end, the input end configured to sample light from the processing chamber, a split optical fiber having a trunk and first and second branches, the trunk optically coupled to the output end of the optical guide, a light source optically coupled to the first branch, and a sensor optically coupled to the second branch.

* * * * *